(12) United States Patent
Rock

(10) Patent No.: US 11,834,350 B2
(45) Date of Patent: Dec. 5, 2023

(54) SYSTEM AND METHOD FOR WATER TREATMENT

(71) Applicant: MICRONIC TECHNOLOGIES, INC., Bristol, VA (US)

(72) Inventor: Kelly Rock, Bristol, VA (US)

(73) Assignee: MICRONIC TECHNOLOGIES, INC., Abingdon, VA (US)

( * ) Notice: Subject to any disclaimer, the term of this patent is extended or adjusted under 35 U.S.C. 154(b) by 100 days.

(21) Appl. No.: 17/274,006

(22) PCT Filed: Apr. 10, 2020

(86) PCT No.: PCT/US2020/027602
§ 371 (c)(1),
(2) Date: Mar. 5, 2021

(87) PCT Pub. No.: WO2020/210581
PCT Pub. Date: Oct. 15, 2020

(65) Prior Publication Data
US 2023/0035924 A1 Feb. 2, 2023

Related U.S. Application Data

(60) Provisional application No. 62/833,026, filed on Apr. 12, 2019.

(51) Int. Cl.
*C02F 1/12* (2023.01)
*B01D 1/16* (2006.01)
(Continued)

(52) U.S. Cl.
CPC .................. *C02F 1/12* (2013.01); *B01D 1/16* (2013.01); *B01D 1/28* (2013.01); *B01D 61/02* (2013.01); *C02F 1/041* (2013.01); *C02F 2301/08* (2013.01)

(58) Field of Classification Search
CPC ... C02F 1/041; C02F 1/12; B01D 1/16; B01D 1/28; B01D 61/02
See application file for complete search history.

(56) References Cited

U.S. PATENT DOCUMENTS 3,234,109 A * 2/1966 Lustenader ............ B01D 3/007
159/24.2
4,421,160 A 12/1983 Stafford et al.
(Continued)

FOREIGN PATENT DOCUMENTS

| FR | 2379482 A | 9/1978 |
|---|---|---|
| JP | 2001-062442 A | 3/2001 |
| JP | 2014-210252 A | 11/2014 |

OTHER PUBLICATIONS

Extended European Search Report dated Jan. 4, 2023, issued in corresponding European Application No. 20787043.7 (9 pgs.).
(Continued)

*Primary Examiner* — Jonathan Miller
(74) *Attorney, Agent, or Firm* — PILLSBURY WINTHROP SHAW PITTMAN, LLP

(57) ABSTRACT

A water treatment system includes a primary evaporator and a secondary evaporator that is also a primary condenser. The primary evaporator relies on imparting rotational motion to the fluid to atomize it. The secondary evaporator may be a tube and shell heat exchanger. Embodiments include heat exchangers for using waste heat of various components. In an embodiment, concentrated effluent is recirculated and combined with influent to improve efficiency of the system to achieve zero liquid discharge and aid in continuous cleaning of the system.

15 Claims, 8 Drawing Sheets

(51) Int. Cl.
  *B01D 61/02* (2006.01)
  *C02F 1/04* (2023.01)
  *B01D 1/28* (2006.01)

(56) References Cited

U.S. PATENT DOCUMENTS

| | | | |
|---|---|---|---|
| 5,133,860 | A | 7/1992 | Tai |
| 6,553,753 | B1 | 4/2003 | Payling et al. |
| 7,837,768 | B2 * | 11/2010 | Sanderson ......... B01D 19/0005 210/103 |
| 10,137,384 | B2 | 11/2018 | Rock |
| 10,661,194 | B2 * | 5/2020 | Zhu ....................... B01D 5/006 |
| 11,383,179 | B2 * | 7/2022 | Abbasi ..................... B01D 1/16 |
| 2011/0017584 | A1 * | 1/2011 | Stevenson .............. B01D 5/006 239/371 |
| 2013/0048258 | A1 | 2/2013 | Yang |
| 2014/0034478 | A1 | 2/2014 | Rock |
| 2015/0047812 | A1 | 2/2015 | Bilet et al. |
| 2015/0360971 | A1 * | 12/2015 | Schleiffarth ........... B01D 1/221 202/176 |
| 2017/0225096 | A1 | 8/2017 | Rock |
| 2018/0345167 | A1 * | 12/2018 | Zhu ....................... B01D 5/0003 |
| 2019/0060834 | A1 | 2/2019 | Katz |
| 2021/0039008 | A1 * | 2/2021 | Abbasi ................... B01D 5/006 |

OTHER PUBLICATIONS

International Search Report dated Jul. 6, 2020, issued in corresponding International Patent Application No. PCT/US2020/027602 (3 pgs.).

Written Opinion of the International Searching Authority dated Jul. 6, 2020, issued in corresponding International Application No. PCT/US2020/027602 (9 pgs.).

Japanese Office Action issued in corresponding Japanese Patent Application No. 2021-560306, dated Sep. 26, 2023.

* cited by examiner

SYSTEM AND METHOD FOR WATER TREATMENT

This application is the U.S. National Phase of International Application No. PCT/US2020/027602, which claims priority to and the benefit of U.S. Provisional Patent Application 62/833,026, filed Apr. 12, 2019. The subject matter of each of which is incorporated herein by reference in its entirety.

BACKGROUND OF THE INVENTION

Embodiments described herein relate to systems and methods for removing a solute from a solution. More particularly, the embodiments described herein relate to systems and methods for the removal of organisms, minerals, other dissolved solids and/or contaminants from water.

There is a need in the industry to develop a zero liquid discharge system for removing solutes from fluid. In particular, concentrated industrial waste brines can be difficult to dispose of, requiring costly shipping to a processing center along with the subsequent processing in evaporator systems which may also be expensive in terms of energy usage as well as economic costs.

By 2050, global water demand is projected to increase by 55% mainly due to growing demands from manufacturing, thermal electricity generation, and domestic use. While 70% of the world's fresh water supply is used for agricultural purposes, in developed countries the industrial market is the biggest consumer, a trend expanding to other developing markets. Of the billions of gallons of industrial water used daily, 69%, while treated for discharge, is not reused. The U.S. alone produces over 90 trillion gallons of wastewater each year that is not re-used.

Water recovery from saline sources, such as seawater; brackish ground water; reverse osmosis reject streams; produced water; wastewaters; and industrial process waters; is necessary to meet municipal and industrial water needs in many regions. Desalination technologies are problematic due to high total dissolved solids (TDS) concentrated in the reject stream, extensive logistics and supply chain required, and its negative environment impact. The disposal of concentrated brine reject streams from treatment processes has significant environmental impact, particularly in arid and inland areas. Evaporator systems are the only viable solution to treat and reuse wastewater, especially for the zero liquid discharge (ZLD) objective. However, this type of treatment of brine reject from desalination systems and industrial processes is particularly energy intensive, very costly, and technically challenging.

Thus the inventors have realized a need for a system that may be used for water purification and in particular for ZLD applications. ZLD is becoming an industry priority as the water market moves to a more sustainable future; driven mainly by environmental, economic, and regulatory pressures. The need for evaporative technologies to better manage concentrated wastewater and reduce disposal cost for industry seeking ZLD treatment is growing. A system that is able to implement a ZLD process by concentrating highly contaminated wastewater streams from current industrial processes without large capital and operating expenses and logistics supply chain of current evaporators is therefore desirable.

Thus, a need exists for improved systems and methods for water purification.

SUMMARY AND OBJECTS OF THE INVENTION

In an embodiment, a water treatment system includes a blower motor, configured and arranged to blow a mixture of air and feed water influent containing contaminants through the system, a primary evaporator, including an atomizer configured and arranged to impart rotational velocity and radial velocity to the mixture to atomize it, and a heat exchanger that is configured to receive the mixture from the primary evaporator and to act as both a secondary evaporator, and to receive the mixture from the primary evaporator, and is further configured to act as and a primary condenser.

In an embodiment, a method of operating a water treatment system of the preceding paragraph includes operating the system as described herein.

In an embodiment, a water treatment system further includes a concentrate recirculation circuit configured and arranged to deliver a portion of a concentrated influent to a mixing point to be mixed with influent upstream of the primary evaporator.

In an embodiment, a water treatment system further includes an injection water circuit configured and arranged to deliver injection water to airflow downstream of the blower.

In an embodiment, the injection water circuit includes one or more heat exchangers configured to cool hot injection water prior to delivery to the airflow.

BRIEF DESCRIPTION OF THE DRAWINGS

The invention may be better understood with reference to the drawings.

DETAILED DESCRIPTION

Figure 1:
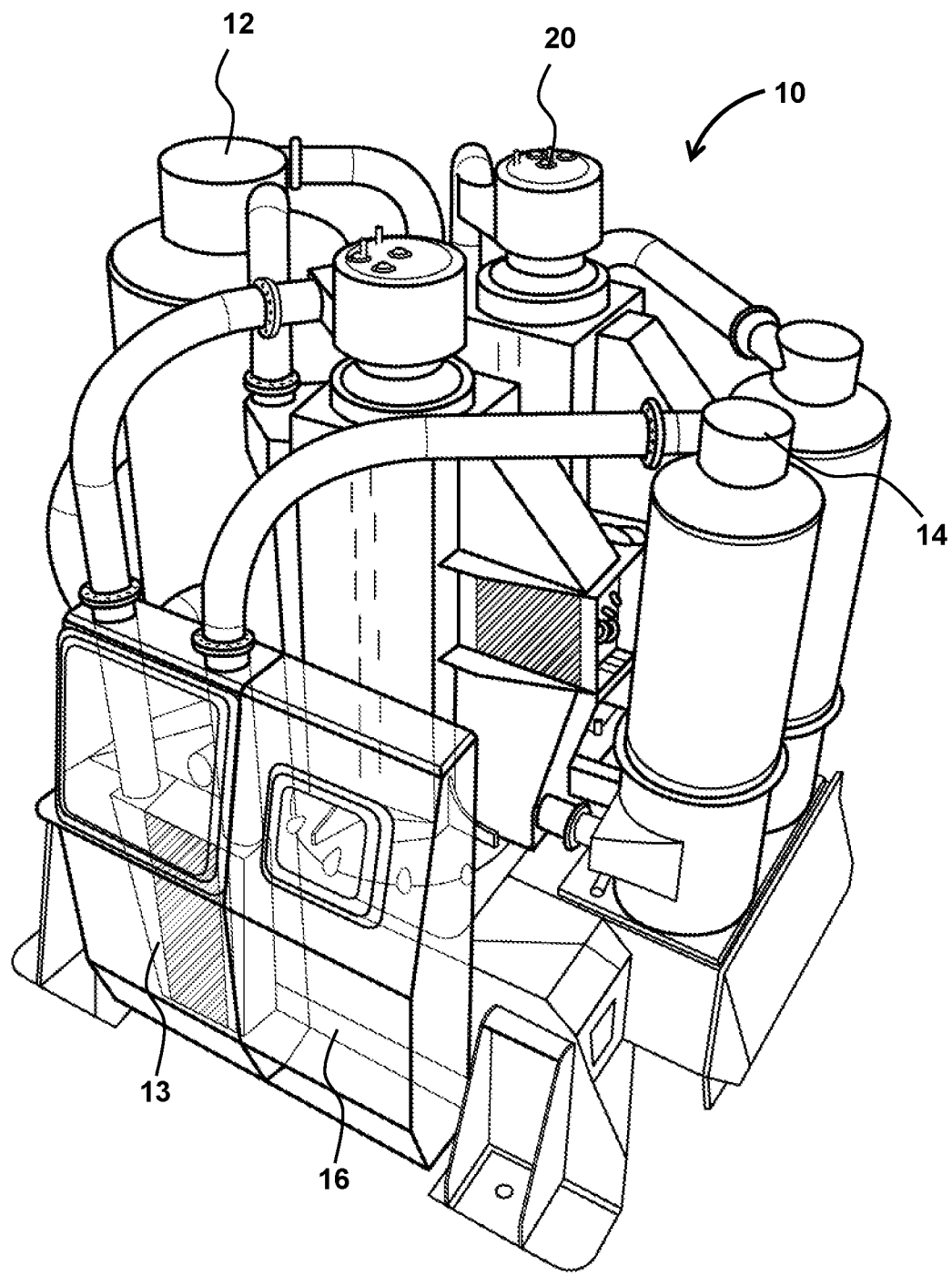
FIG. 1 is a isometric front view of a water processing system in accordance with an embodiment.

A water processing system 10 in accordance with an embodiment is shown in FIG. 1. The system includes an air/water separator 12, a pair of product water/air water separators 14, a product water tank 16, a hot water bath tank 13, and a pair of evaporators 20.

Figure 2:
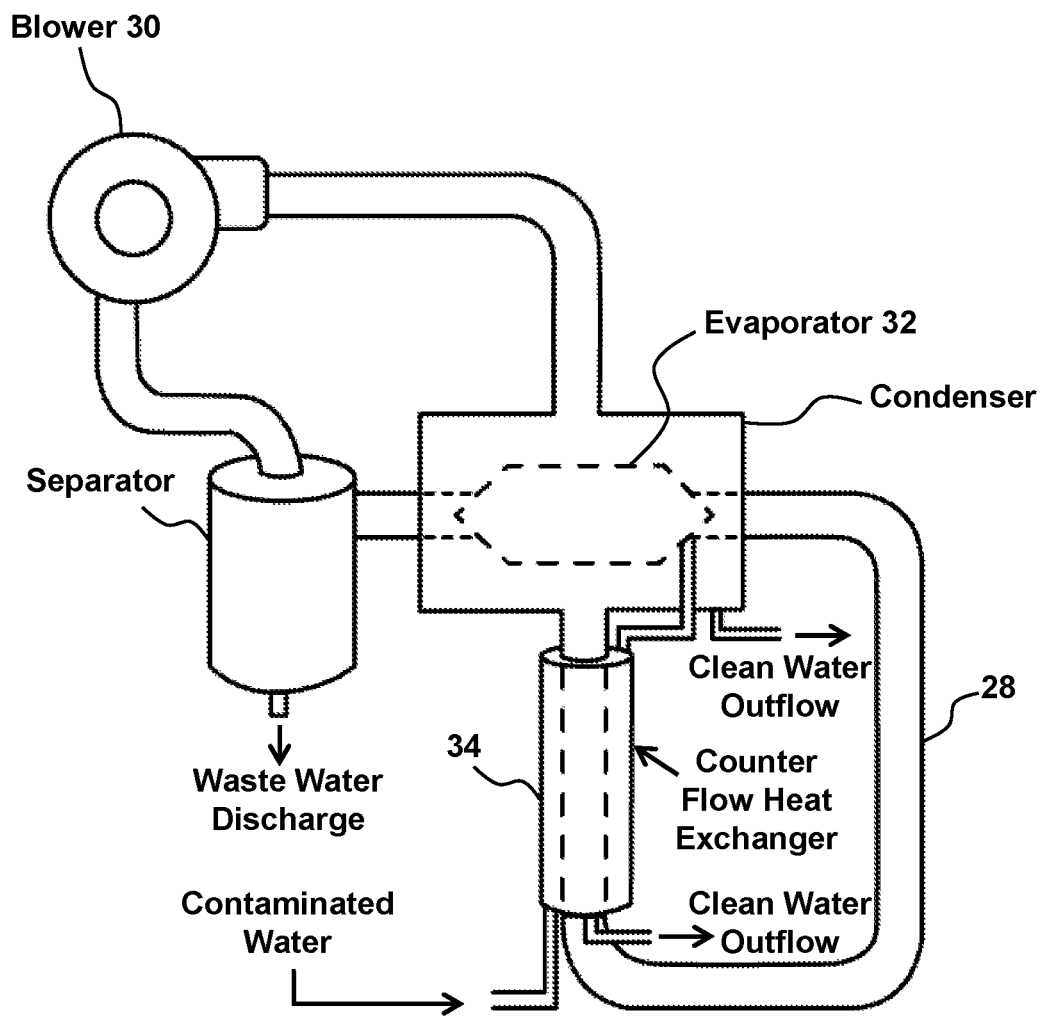
FIG. 2 is a schematic diagram of a water processing system in accordance with an embodiment.
Figure 3:
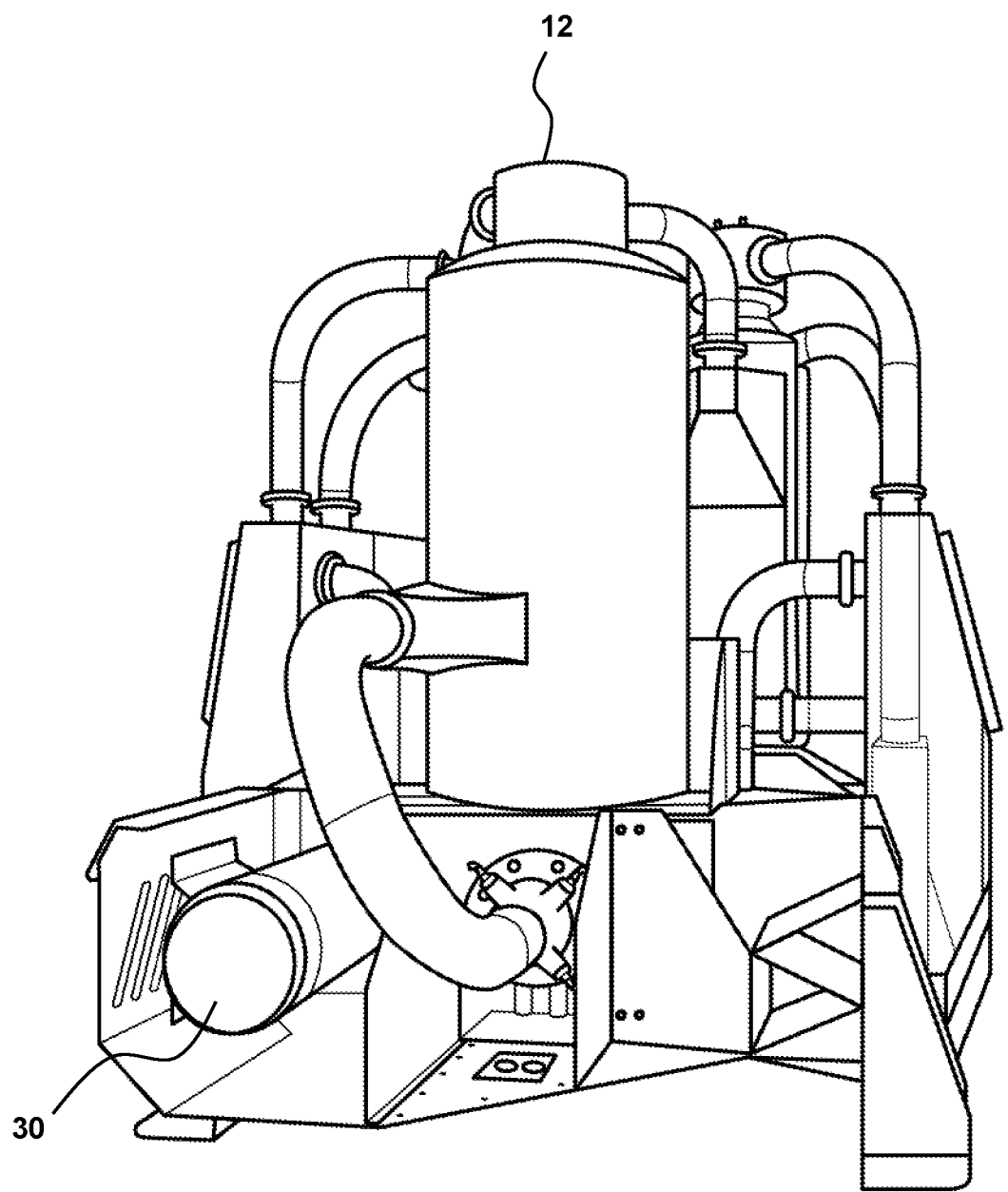
FIG. 3 is a side elevation view of a water processing system in accordance with an embodiment.

As shown in FIG. 2, the cycle is driven by a blower motor 30 which pushes air and fluid (which may be in the form of steam in some portions of the circuit) to be processed into the evaporators. The fluid to be processed includes material in solution or entrained that is to be removed from the fluid for disposal. The solute may include, for example simple salt (sodium chloride) or the fluid may be industrial wastewater incorporating any variety of solutes that may be considered contaminants. For example, the fluid may include suspended solids, dissolved solids, bacteria, heavy metals, fungi, pharmaceuticals, plastic particles, and nano materials. In the case of food production such as cheese production, wastewater may include large loads of organic waste along with saline loads.

The blower may be, for example, a centrifugal pump or blower that produces a flow of air (e.g., inlet air) having a flow rate of between 30 cubic feet per minute and 3000 cubic feet per minute and a pressure of between 3 p.s.i. and 40 p.s.i. In some embodiments, the blower can produce a pressurized airflow within a plenum or the like having a pressure of approximately 5 p.s.i. at a flow rate of approximately 300 cubic feet per minute. An intercooler, not shown, can optionally be included to heat up the air on its way to the evaporator. Beneficially, the intercooler, along with waste heat from the power supply may also be used to warm water at the feed 28 to the evaporator.

The water to be treated is run through an evaporator 32 that includes a heat exchanger where the relatively hot air from the blower is cooled by the relatively cooler water. As shown in FIG. 2, a counter flow heat exchanger 34 receives contaminated water, which is warmed by condensation of clean water vapor which condenses and flows out through the clean water outflow.

Figure 4:
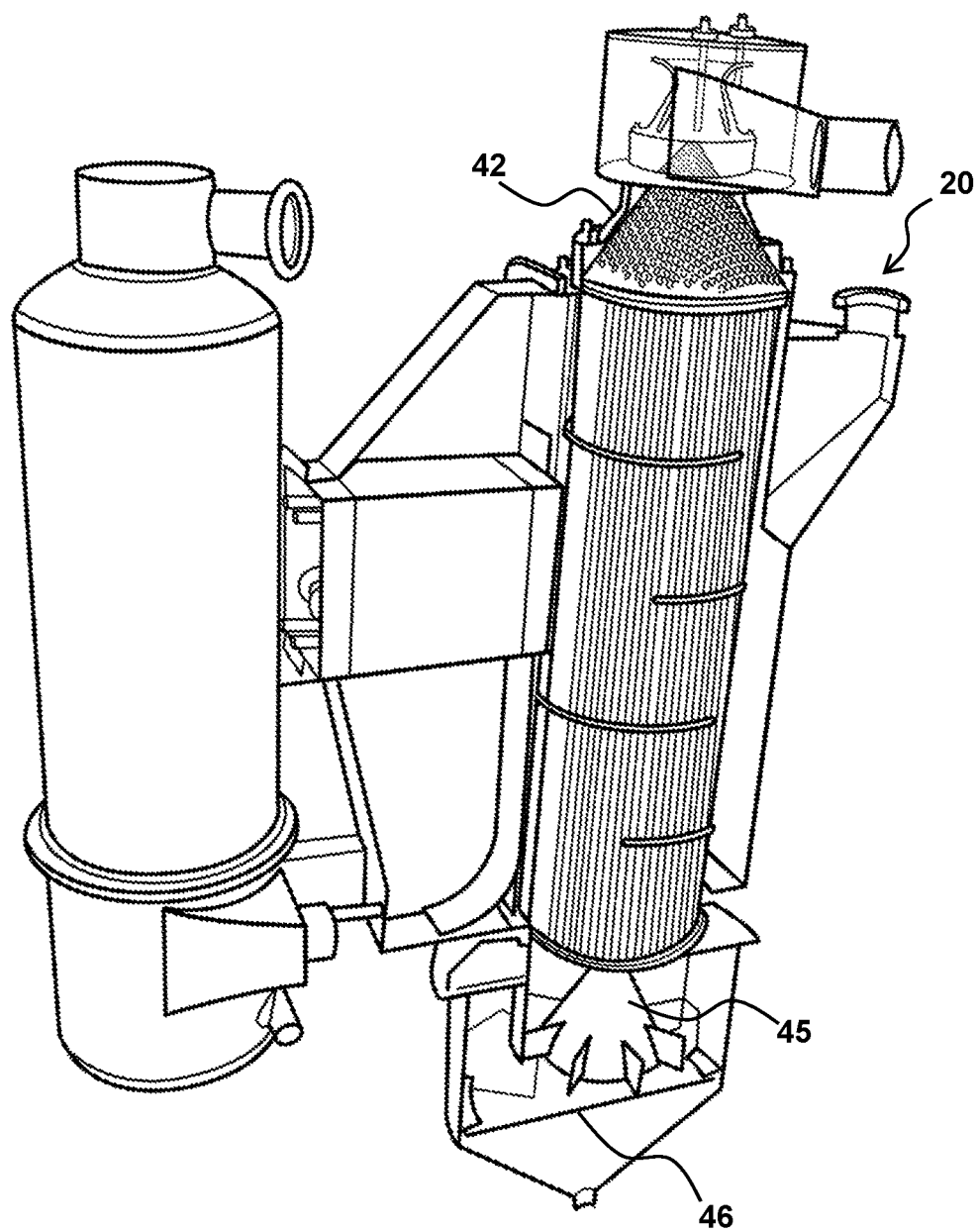
FIG. 4 is a partially cut away view of an evaporator in accordance with an embodiment.

The evaporators 20 may be shell and tube heat exchangers as seen in FIG. 4. The evaporators 20 act as primary condensers and secondary evaporators. In a shell and tube heat exchanger, one fluid flows through the tubes while the other flows on the shell side of the tubes. Heat flows through the tube walls, so the material should be one that is a good conductor of heat. Additionally, it may be useful to use a material that is corrosion resistant and have sufficient strength to maintain pressure differentials between the zones of the exchanger and between the shell and the ambient pressure. Metals, including copper, copper alloys, stainless steels, aluminum, and nickel alloys may be used, for example. The use of a large number of tubes provides a large surface area for heat transfer.

Figure 5:
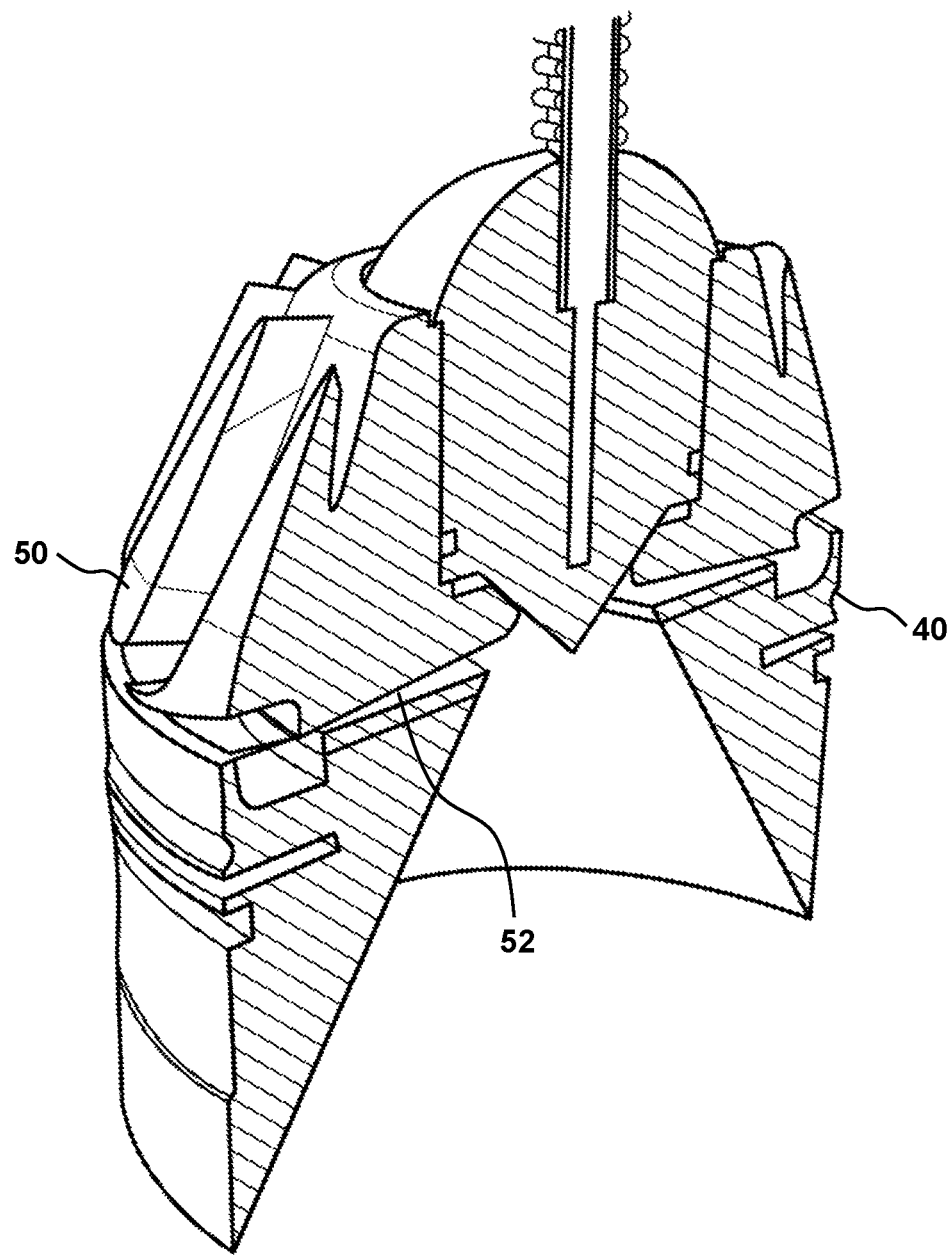
FIG. 5 is a cutaway view of an atomizer in accordance with an embodiment.

As best seen in FIG. 5, the water is injected under pressure by atomizer 40 which acts as the primary evaporator to cause it to atomize, prior to entering the shell and tube heat exchanger. A conical member 42 (FIG. 6) includes holes 44 that are substantially aligned with the openings for the tubes, but are not connected. The fluid inside the tubes undergoes evaporation, while the fluid outside is condensing. Because the blower motor 30 is on the outlet side of the evaporators, it produces vacuum inside the tubes, promoting evaporation in the inner region, while the outside is higher pressure promoting condensation in the outer region.

Figure 6:
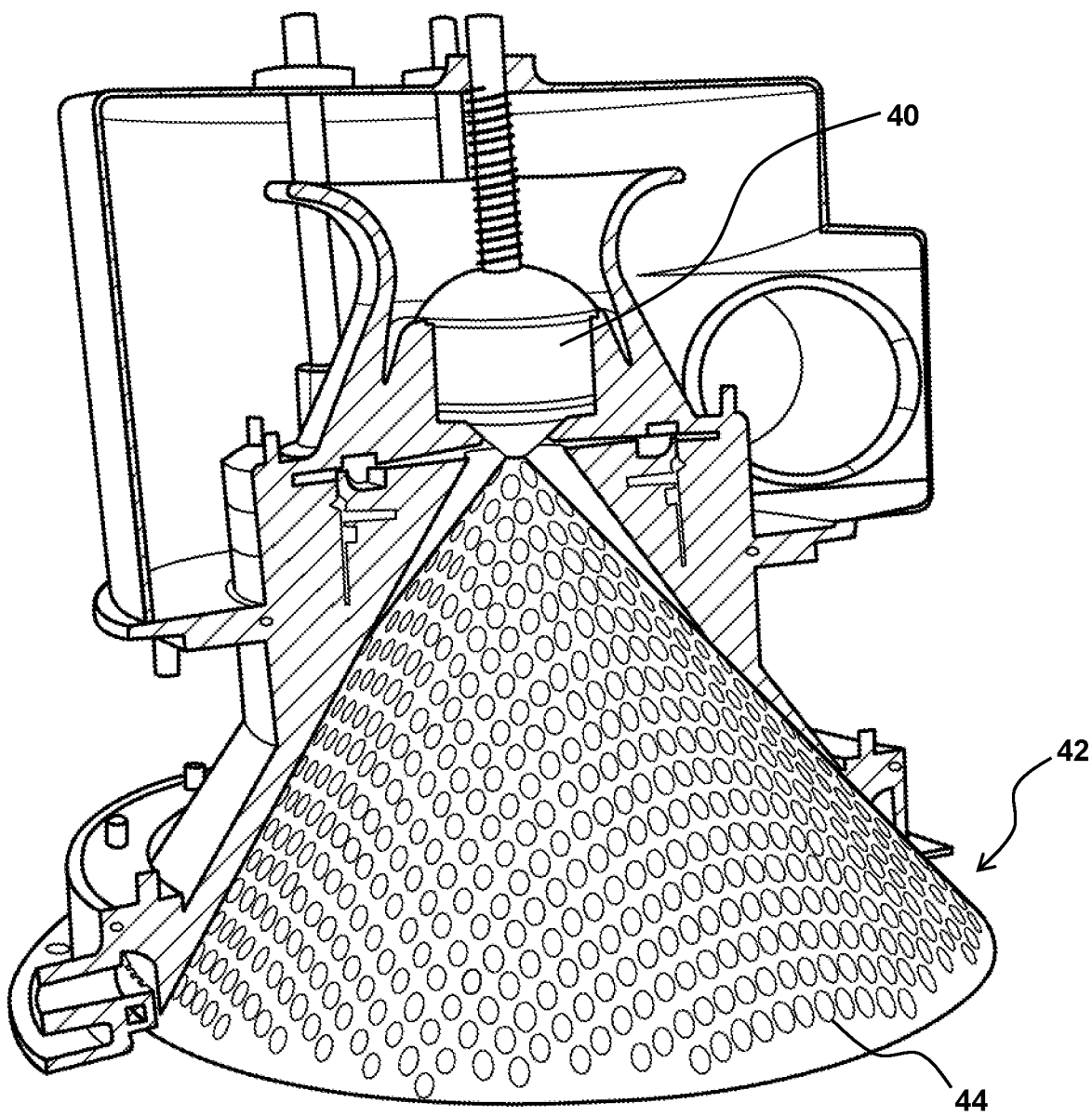
FIG. 6 is a partially cut away view of an atomizer and a cone shaped interface between the atomizer and the evaporator.

The conical member 42, seen in FIG. 6, allows the airflow, small water droplets and crystalline bodies to flow in a sheet along the surface and acts to avoid deposition of solids on the surfaces. This may reduce cleaning and descaling requirements. As will be appreciated, it may nevertheless be useful to ensure that the evaporator is configured to allow easy access for maintenance, cleaning and descaling. The fluid then flows around the inside of the evaporator tubes while condensation forms on the outside of the evaporator tubes. In an embodiment, the cone is at a same angle as the primary evaporator.

The atomizer 40 (which may also be referred to as the "pod") is a device that is configured to mix liquid influent water with high velocity rotating air to atomize the fluid. One example of a type of atomizer that may be used in conjunction with this system is described in U.S. Pat. No. 10,507,402, herein incorporated by reference in its entirety.

In some embodiments, the influent water is further mixed with recirculated concentrate water as will be described in greater detail below.

The atomizer 40 is shaped such that it imparts an angular velocity and a radial inward velocity to the water droplets and is able to saturate the air. In an embodiment, fins 50 impart a rotational component to the airflow. The air then flows inward along the flat slot, imparting the radial inward velocity. This airflow is under partial vacuum. In an embodiment, the atomizer 40 from time to time has feedwater injected into its input flow path to clean any deposited solids. This may be on a schedule or an ad hoc basis in embodiments.

The output of the atomizer/primary evaporator 40 is predominantly fine aerosols entrained in the airflow and the aerosol particulates. The interface device acts to preserve the aerosols as they pass down the inside of the tubes. The heat moving through the walls of the tubes is heating the air, which lowers the relative humidity, allowing the aerosols to evaporate further.

A conical flow equalizer 45 positioned at the outlet end of the shell and tube unit acts to create a toroidal flow path that tends to evenly distribute flow among the tubes, A plate separator 46 at the output end of the shell and downstream of the equalizer 45 acts to separate concentrate/vapor mixture. In an embodiment, the system is configured to be a zero liquid discharge system that outputs precipitated solid waste rather than concentrated brine as a waste stream.

While the term zero liquid discharge is used herein, it should be understood that in some implementations, the waste stream may include some amount of liquids. That is, as the term is used in the art, it may encompass near-zero liquid discharge or minimal liquid discharge, and the solids discharged may include some amount of liquid moisture. Likewise, a ZLD process may include, in embodiments, a filter press or centrifuge process to remove residual moisture from the precipitated solid waste after processing with the system.

In some embodiments, the water purification system can include a control system (not shown) to control the flow of air and or water within certain portions of the system. For example, the control system can include a set of components such as pressure sensors and adjustable valves to monitor and/or control the flow rate and pressure of air from the blower. Similarly, the flow rate, pressure, and/or saturation of the solution entering or exiting the atomizer assembly and/or the evaporator assembly can be controlled. In this manner, the saturation level of the mixture can be monitored and controlled.

In an embodiment, water may be injected into the blower output to cool it and re-saturate the air before going to the primary condenser/secondary evaporator. Likewise, the blower itself produces heat, and that heat can be used as part of the energy involved in operating the system by passing the output of the blower through a heat exchanger (intercooler, as noted above). This will be described in greater detail below with reference to FIGS. 7 and 8.

Figure 7:
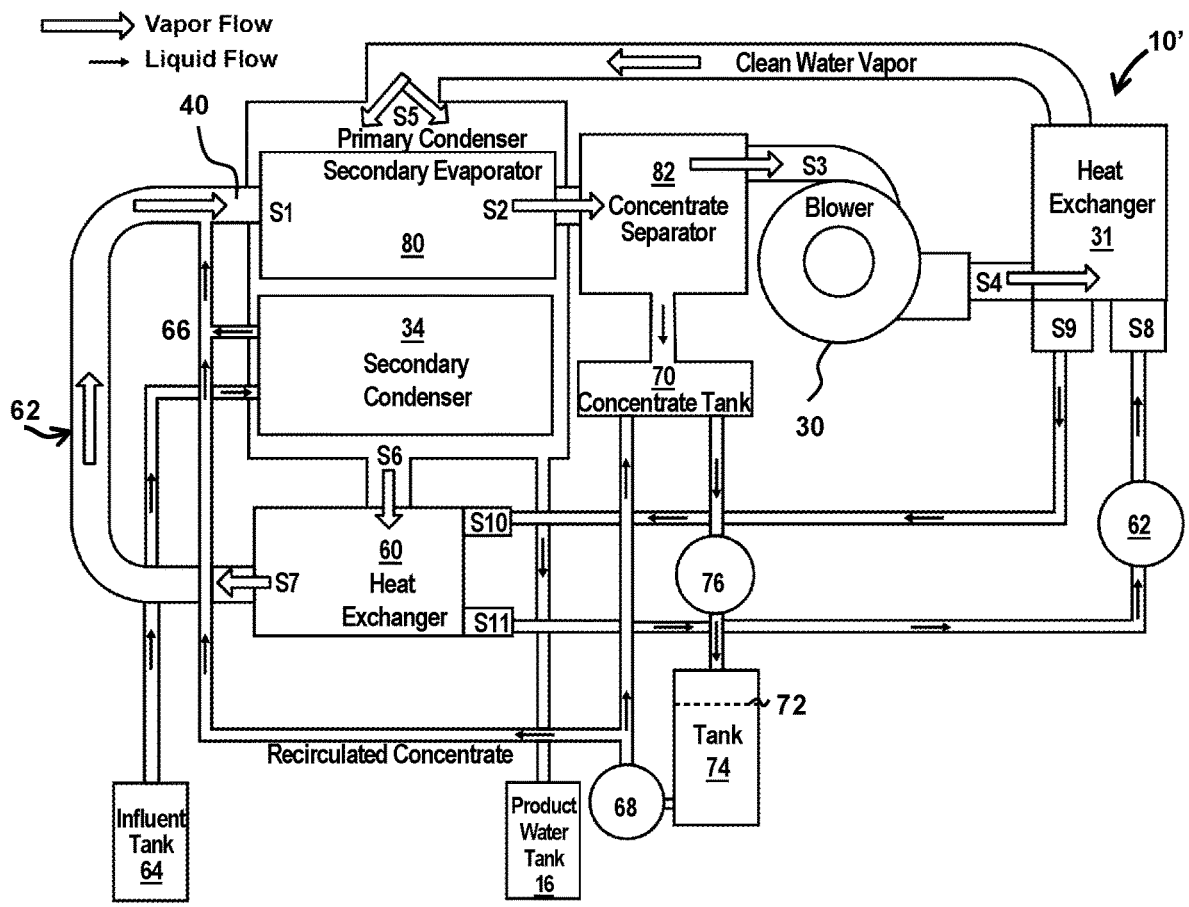
FIG. 7 is a schematic diagram of a water processing system in accordance with an embodiment.

FIG. 7 is a schematic of an embodiment similar to the embodiment of FIG. 2, but with additional structure illustrated. As noted above, FIG. 2 does not illustrate the intercooler nor the fluid loop for the intercooler. FIG. 7 includes this feature along with some others.

The water processing system 10' of FIG. 7 includes, similarly to the previously described embodiment, a blower motor 30 which pushes air and entrained fluid (which may be in the form of steam in some portions of the circuit) to drive the flow through the system. In this embodiment, a first heat exchanger 31 is optionally included downstream of the blower motor 30. As noted above, the blower motor may produce excess heat. This heat is partially captured in the first heat exchanger 31, reducing the temperature of the airflow from the blower. In an embodiment, this process serves to align the temperature of the feedwater with that of the airflow so that injecting the feedwater does not alter the temperature of the process stream. At the same time, the heat exchanger heats a fluid that can be pumped to the second heat exchanger 60 where it can be used to heat vapor that is passing through the evaporation/condensation portion of the circuit. A heat exchanger pump 62 moves the heat transfer fluid through the heat exchangers 31, 60.

The air and vapor mixture from the heat exchanger 31 passes into the primary condenser/secondary evaporator 80, and a portion of the vapor condenses and passes to the product water tank 16.

Influent containing material to be removed is provided from influent tank 64. It is pumped through the secondary condenser 34 which acts here as an influent preheater in this part of the loop. The fluid then flows to a mixing point 66 where it combines with recirculated concentrate pumped by the recirculated concentrate feed pump 68 from the concentrate tank 70. In the embodiment as shown, the recirculated concentrate feed pump 68 does not receive concentrate for recirculation directly from the concentrate tank 70, but rather first the concentrate passes through a sieve separator 72 in a contaminant tank 74 that is used to capture the precipitated contaminants. In an embodiment, the sieve separator may be periodically removed and the material collected. In an alternate embodiment, the sieve may be a continuously or intermittently moving belt such that clean portions of the belt are placed in the flow and portions having precipitated contaminants are removed from the flow path for cleaning/release of the contaminants into a collection reservoir. A portion of the concentrate is passed back to the concentrate tank by the feed pump 68, while another portion is recirculated through the system after mixing with the influent at the mixing point 66. An additional scavenger pump 76 may be included for transferring concentrate from the concentrate tank 70 to the contaminant tank 74.

The reinjection serves to align the feed rate with the evaporation rate of the system. In an example, for 90 gal/day of feedwater, 300 gal/day of recirculated concentrate may be used. As the device is scaled up, it is expected that the recirculation amount will not increase in the same ratio, but rather may tend to stay at a similar rate of recirculation for a larger rate of feedwater processing. The amount of recirculation can be altered as necessary to maintain the feed rate in view of empirical evaporation rates.

The influent and recirculated concentrate is then mixed with the liquid/vapor mixture from the second heat exchanger at a primary evaporator. As in the preceding embodiments, the primary evaporator may be an atomizer 40 that feeds atomized liquid mixed with air through the secondary evaporator (inside of the evaporator tubes in the shell and tube heat exchanger) and to the concentrate separator 82. The concentrate separator 82 separates concentrate and passes it to the concentrate tank 70, and passes the vapor and air back through the blower 30 to begin the loop again.

In this embodiment, sensors S1 . . . S12 may be included to assist in controlling and monitoring operation of the system. The sensors may be configured to monitor parameters such as temperature, pressure, and flow rates, for example. In an embodiment, S1 monitors temperature, pressure, and flow rate at the evaporator input, S2 monitors temperature and pressure of the evaporator output, S3 monitors temperature and pressure of the blower input, S4 monitors temperature and pressure of the blower output, S5 and S6 monitor temperature and pressure of the condenser input and output respectively. S8 and S9 monitor the temperature of the first heat exchanger liquid input and output respectively. S7 monitors temperature of the vapor output of the second heat exchanger and S11 and S12 monitor temperature of the second heat exchanger liquid input and output respectively.

Figure 8:
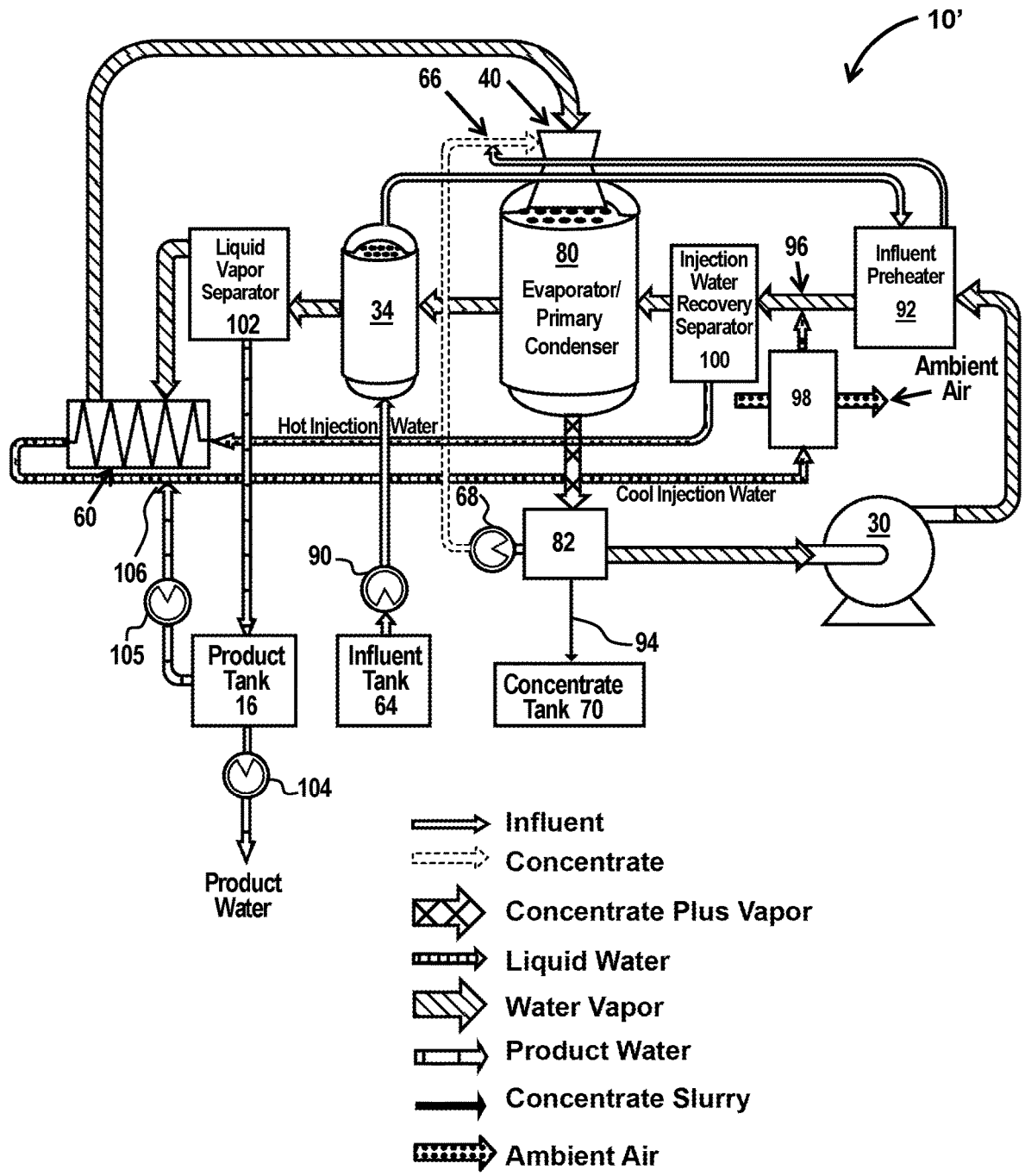
FIG. 8 is a schematic diagram of a water processing system in accordance with an embodiment.

Turning now to FIG. 8, a further embodiment 10" is illustrated. In this embodiment, influent water is pumped from the influent tank 64 via influent pump 90 through the secondary condenser 34, which acts as a heat exchanger to warm the influent with heat from the vapor flow passing through the condenser side of the secondary condenser 34.

Optionally, influent preheater 92 may be arranged downstream of the blower 30. The influent preheater 92 is a heat exchanger configured to remove heat from the air/vapor loop generated in the blower 30 and use that heat to further preheat the influent flow.

From the influent preheater 92, the influent is passed to the mixing point 66 where it is combined with recirculated concentrate. A recirculated concentrate feed pump 68 provides the flow of recirculated concentrate from the concentrate separator 82. The mixed recirculated concentrate and preheated influent is atomized at the atomizer/primary evaporator 40. As described above, the atomizer 40 is configured to produce a helical flow directed radially inward in the atomizer 40. This flow passes from the atomizer 40 into the evaporator/primary condenser 80 on the evaporator side which is the inside of the tube. This side, as described above, is maintained at a relatively low temperature and pressure.

The action of the evaporator 80 produces water vapor, which is generally clean and constitutes the majority of the input water. The remainder of the water remains as a concentrated fluid—with a high concentration of contaminants which will generally be in a droplet form. The liquid concentrate and vapor are passed to the concentrate separator 82. In an embodiment, the separator 82 includes two components, a centrifugal type separator component, and a dispersion component, allowing the flows to slow down to permit the air and water to separate and the liquid to gather in a sump, where the concentrate is passed back via the recirculation pump to the mixing point 66. The concentrate is pumped from the concentrate separator 82 to the concentrate tank 70, while the vapor and air are returned to the input of the blower 30.

The vapor and air first optionally pass through the influent preheater 92 to remove excess heat from the blower motor 30 and then cool water is injected at the water injection point 96 to further cool the vapor and air. The injection water is cooled by a heat exchanger 98 that uses ambient air as a coolant. The injection water, vapor, and air mixture passes through an injection water recovery separator 100 which is a centrifugal separator that separates water from air, and the now hot injection water may be passed through a heat exchanger 60 before being returned to the water injection point 96 via the heat exchanger 98.

The other loop of heat exchanger 60 will be discussed further below.

The remaining vapor and air mixture passes through the primary condenser portion of the evaporator/primary condenser 80, then from there to the secondary condenser 34. At the primary condenser 80, the majority of the vapor is condensed to liquid. A remaining portion is condensed in the secondary condenser 34. The liquid, entrained in the airflow, passes through a liquid/vapor separator 102 where the product water is separated from the airflow. The airflow proceeds, via the heat exchanger 60 back to the evaporator to continue through the loop. Product water is pumped by pump 104 from the product tank 16. The heat exchanger 60 uses the airflow through its cool side to cool the injection water that is passing through the warm side of the exchanger 60. Simultaneously, the airflow is heated, lowering its relative humidity due to whatever amount of vapor remains entrained therein. Optionally as shown, some of the product water may be pumped by injection water pump 105 to supply water for the injection loop where it may be injected at injection point 106.

The description of the present application has been presented for purposes of illustration and description, and is not intended to be exhaustive or limited to the invention in the form disclosed. Many modifications and variations will be apparent to those of ordinary skill in the art. For example, aspects of each embodiment may be combined with aspects of each other embodiment. As one example, the preheater may be used with the embodiment of FIG. 2 as well as the embodiments of FIGS. 7 and 8. Various embodiments of separators and heat exchangers may find use in each of the different described embodiments. The specific placement of pumps may vary from upstream to downstream of the tanks with which they interact. The embodiments were chosen and described in order to best explain the principles of the invention, the practical application, and to enable others of ordinary skill in the art to understand the invention for various embodiments with various modifications as are suited to the particular use contemplated. Unless otherwise specified, the term "about" should be understood to mean within ±10% of the nominal value.

While common reference numerals are used to denote commonly named components, this should not be taken to mean that those components must be identical. In practice, they will be designed in accordance with operational considerations of the various systems, including, for example, flow rates, type of influent, concentration of contaminants, and the like. So, for example, while each system described includes a primary condenser/secondary evaporator, those may, in practice, take somewhat different forms.

As used in this specification, the term "fluid" may be understood to refer to a liquid, a gas, a liquid including solids which may be in solution or entrained, or combinations thereof. The terms "atomize" and "vaporize" describe the process of reducing a liquid or solution into a series of tiny particles, droplets and/or a fine spray. For example, as used herein, a device or component configured to atomize a liquid and/or produce and atomized flow of a liquid can be any suitable device or component that reduces and/or "breaks" the liquid into a series of tiny particles and/or a fine spray.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof. The term "substantially" may be understood to encompass a variation of 10%, for example.

The descriptions above are intended to be illustrative, not limiting. Thus, it will be apparent to one skilled in the art that modifications may be made as described without departing from the scope of the claims set out below.

The invention claimed is:

1. A fluid treatment system comprising:
   a blower motor, configured and arranged to blow a mixture of air and influent containing contaminants through the system;
   a primary evaporator, including an atomizer configured and arranged to impart rotational velocity and radial velocity to the mixture to atomize the mixture;
   a heat exchanger that is configured to receive the mixture from the primary evaporator and to act as both a secondary evaporator and a primary condenser;
   a concentrate separator, configured and arranged to receive concentrate vapor mix from the secondary evaporator; and
   a concentrate recirculation conduit configured to conduct a portion of the concentrate to be mixed with the influent.

2. A fluid treatment system according to claim 1, wherein the heat exchanger comprises a shell and tube heat exchanger.

3. A fluid treatment system according to claim 2, further comprising a conical interface between the shell and tube heat exchanger and the atomizer, wherein the conical interface has a plurality of holes corresponding to openings in tubes of the shell and tube heat exchanger.

4. A fluid treatment system according to claim 1, wherein the concentrate separator is configured to separate product water from the secondary evaporator from the contaminants.

5. A fluid treatment system as in claim 4, wherein the concentrate separator is configured to collect precipitated solid portions of the contaminants.

6. A fluid treatment system as in claim 5, wherein the system is a zero liquid discharge system.

7. A fluid treatment system as in claim 1, further comprising an influent preheater configured and arranged to warm influent upstream of a mixing point where the influent is mixed with the air.

8. A fluid treatment system as in claim 1, further comprising an injection water circuit, the injection water circuit being configured and arranged to inject water at a temperature lower than that of air exiting the blower into the air downstream of the blower at an injection water mixing point.

9. A fluid treatment system as in claim 8, wherein the injection water circuit includes a first injection water heat exchanger, configured and arranged to receive hot injection water from an injection water recovery separator downstream of the injection water mixing point and to cool it prior the injection water circulating back to the injection water mixing point.

10. A fluid treatment system as in claim 8, wherein the injection water circuit further comprises a heat exchanger configured and arranged to cool the injection water upstream of the injection water mixing point using ambient air.

11. A fluid treatment system as in claim 9, further comprising a second injection water heat exchanger downstream of the first injection water heat exchanger and being configured and arranged to cool the injection water upstream of the injection water mixing point using ambient air.

12. A fluid treatment system comprising:
    a blower motor, configured and arranged to blow a mixture of air and influent containing contaminants through the system;
    a primary evaporator, including an atomizer configured and arranged to impart rotational velocity and radial velocity to the mixture to atomize the mixture;

a heat exchanger that is configured to receive the mixture from the primary evaporator and to act as both a secondary evaporator and a primary condenser;

a counter flow heat exchanger, downstream of the secondary evaporator/primary condenser, configured to pre-heat the influent prior to the influent being mixed with the air;

a concentrate separator, downstream of the primary condenser, configured to receive concentrate vapor mix, and to separate solid precipitated contaminants from a fluid stream of water containing concentrated contaminants in solution;

a concentrate recirculation circuit configured to recirculate at least a portion of the water containing concentrated contaminants in solution to be mixed with the influent upstream of the primary evaporator; and a concentrate tank configured to store the separated solid precipitated contaminants.

13. A fluid treatment system as in claim 12, further comprising an injection water circuit, the injection water circuit being configured and arranged to inject water at a temperature lower than that of air exiting the blower into the air downstream of the blower at an injection water mixing point.

14. A fluid treatment system as in claim 12, further comprising an influent preheater configured and arranged to warm influent upstream of a mixing point where the influent is mixed with the air.

15. A fluid treatment system comprising:
a blower motor, configured and arranged to blow a mixture of air and influent containing contaminants through the system;

a primary evaporator, including an atomizer configured and arranged to impart rotational velocity and radial velocity to the mixture to atomize the mixture; and a shell and tube heat exchanger that is configured to receive the mixture from the primary evaporator and to act as both a secondary evaporator and a primary condenser; and, a conical interface positioned between the shell and tube heat exchanger and the atomizer, wherein the conical interface has a plurality of holes corresponding to openings in tubes of the shell and tube heat exchanger.

* * * * *